US009378034B2

(12) United States Patent
Matov et al.

(10) Patent No.: US 9,378,034 B2
(45) Date of Patent: Jun. 28, 2016

(54) DYNAMIC BYTECODE MODIFICATION OF CLASSES AND CLASS HIERARCHIES

(71) Applicants: Peter K. Matov, Sofia (BG); Alexandrina Ivanova, Sofia (BG)

(72) Inventors: Peter K. Matov, Sofia (BG); Alexandrina Ivanova, Sofia (BG)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 14/137,858

(22) Filed: Dec. 20, 2013

(65) Prior Publication Data

US 2014/0344792 A1    Nov. 20, 2014

Related U.S. Application Data

(60) Provisional application No. 61/824,203, filed on May 16, 2013.

(51) Int. Cl.
G06F 9/45 (2006.01)
G06F 9/455 (2006.01)

(52) U.S. Cl.
CPC ................................ G06F 9/45525 (2013.01)

(58) Field of Classification Search
USPC .................................................. 717/139–152
IPC ..................... G06F 8/315,9/2228, 9/4425, 8/41, G06F 8/51, 8/52, 8/53
See application file for complete search history.

(56) References Cited

U.S. PATENT DOCUMENTS

| | | | |
|---|---|---|---|
| 6,072,953 A | 6/2000 | Cohen et al. | |
| 6,324,543 B1 | 11/2001 | Cohen et al. | |
| 6,412,107 B1 * | 6/2002 | Cyran et al. | 717/148 |
| 6,925,638 B1 | 8/2005 | Koved et al. | |
| 6,985,909 B2 | 1/2006 | Blohm | |
| 7,367,025 B1 * | 4/2008 | Nikolov et al. | 717/148 |
| 7,424,705 B2 * | 9/2008 | Lewis et al. | 717/148 |
| 7,426,723 B1 * | 9/2008 | Nikolov | 717/151 |
| 7,506,315 B1 * | 3/2009 | Kabadiyski et al. | 717/128 |
| 7,568,196 B2 | 7/2009 | Krebs | |
| 7,644,395 B1 | 1/2010 | Frey et al. | |
| 7,743,367 B1 * | 6/2010 | Nikolov et al. | 717/148 |
| 7,836,438 B1 * | 11/2010 | Nikolov | 717/148 |

(Continued)

OTHER PUBLICATIONS

Zheng et al, "Dynamic Optimization of Bytecode Instrumentation", ACM, pp. 21-30, 2013.*

(Continued)

*Primary Examiner* — Anil Khatri
(74) *Attorney, Agent, or Firm* — Schwegman Lundberg & Woessner, P.A.

(57) ABSTRACT

Various systems and methods for dynamic bytecode modification of classes and class hierarchies are described herein. In various embodiments, a Java® agent is received at a launch of a Java® Virtual Machine (JVM®), the agent implementing a premain method, the premain method accepting a reference to an instrumentation instance. The instrumentation reference is then stored, a deployment container is initialized, and, within the deployment container, an instance of an application is created. The instrumentation reference is then provided to the application instance. A class transformer is then retrieved from a persistence provider, and the class transformer is wrapped by an O.R. Persistence Container Class Transformer, which is then registered with the instrumentation instance. A class to be transformed is passed to the class transformer, which dynamically modifies the bytecode of the class before the class is loaded by the JVM®.

18 Claims, 8 Drawing Sheets

(56) References Cited

U.S. PATENT DOCUMENTS

| | | | |
|---|---|---|---|
| 7,840,950 B2 | 11/2010 | Stoodley et al. | |
| 7,840,951 B1 * | 11/2010 | Wright et al. | 717/152 |
| 7,895,580 B1 | 2/2011 | Nikolov | |
| 7,926,042 B2 * | 4/2011 | Mehta et al. | 717/130 |
| 7,987,456 B2 * | 7/2011 | Mariani | 717/143 |
| 7,996,827 B2 * | 8/2011 | Vorbach et al. | 717/149 |
| 8,370,818 B2 * | 2/2013 | Osminer et al. | 717/140 |
| 8,453,128 B2 * | 5/2013 | Daynes et al. | 717/148 |
| 8,533,698 B2 * | 9/2013 | Zhu et al. | 717/151 |
| 8,701,096 B2 * | 4/2014 | Iyer et al. | 717/151 |
| 8,769,518 B1 * | 7/2014 | Daudel et al. | 717/166 |
| 8,788,569 B2 * | 7/2014 | Griffiths et al. | 709/202 |
| 8,843,912 B2 * | 9/2014 | Brauneis et al. | 717/158 |
| 8,856,726 B2 * | 10/2014 | Conrad et al. | 717/104 |
| 8,869,103 B2 * | 10/2014 | Conrad et al. | 717/106 |
| 8,959,496 B2 * | 2/2015 | Schulte et al. | 717/148 |
| 2008/0141336 A1 | 6/2008 | Haller | |
| 2010/0318978 A1 | 12/2010 | Nikolov et al. | |
| 2010/0333072 A1 | 12/2010 | Dulip et al. | |
| 2012/0246487 A1 | 9/2012 | Gu et al. | |

OTHER PUBLICATIONS

Suganuma et al, "Design and Evaluation of Dynamic Optimizations for a Java Just-In-Time Compiler" ,ACM Transactions on Programming Languages and Systems, vol. 27, No. 4, pp. 732-785, 2005.*

Dmitriev "Design of JFluid: A Profiling Technology and Tool Based on Dynamic Bytecode Instrumentation", Sun Microsystems Laboratories, M/S MTV29-01 2600 Casey Avenue Mountain View, CA 94043, pp. 1-22, 2003.*

Arcuri et al, "Automated Unit Test Generation for Classes with Environment Dependencies", ACM, pp. 79-89, 2014.*

Mastrangelo et al, "JNIF: Java Native Instrumentation Framework", ACM, pp. 194-199, 2014.*

Xu et al, "Dynamic Instrumentation of Threaded Applications", ACM, pp. 49-59, 1999.*

Binder, Walter, et al., "Reengineering Standard Java Runtime Systems through Dynamic Bytecode Instrumentation", Faculty of Informatics, University of Lugano; Seventh IEEE International Working Conference on Source Code Analysis and Manipulation; IEEE, (2007), 91-100.

Bruneton, Eric, "ASM: a code manipulation tool to implement adaptable systems", (2002), 12 pgs.

* cited by examiner

DYNAMIC BYTECODE MODIFICATION OF CLASSES AND CLASS HIERARCHIES

CLAIM OF PRIORITY

This patent application claims the benefit of priority, under 35 U.S.C. §119(e), to U.S. Provisional Patent Application Ser. No. 61/824,203, entitled "DYNAMIC BYTECODE MODIFICATION OF CLASSES AND CLASS HIERARCHIES," filed on May 16, 2013, which is hereby incorporated by reference herein in its entirety.

BACKGROUND INFORMATION

Software engineers have used object-oriented programming to model real world entities and concepts for decades. Object-oriented languages, such as Java®, allow programmers to model entities and concepts by using object-oriented constructs such as encapsulation, inheritance, and polymorphism. Although object-oriented code may be designed to model real-world entities and concepts accurately, object-oriented code is usually integrated with "infrastructure" code that is designed to interact with particular software packages, frameworks, and hardware.

The difficulty of modifying an object-oriented codebase increases with the size of the codebase. The term codebase, or code base, is used in software development to mean the entire collection of source code used to build a particular application or component. In some situations, the codebase's software engineers may want to integrate the codebase with other software, such as another codebase, another software framework, or another software product. However, the other software may require the codebase to have a particular structure or certain features that the codebase does not have. For example, some software may require the classes of the codebase to inherit (or "extend") from other classes, to implement certain interfaces, to call certain methods, etc. Although modifying the codebase to accommodate the requirements may be possible, the modifications might be costly, time-consuming, and may introduce other problems or errors.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to limit voluntarily the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Bytecode modification is a common technique for weaving logic into an existing object-oriented class. Dynamic bytecode modification is a valuable technique for weaving logic into an existing object-oriented class in a transparent manner. Using dynamic bytecode modification enhances virtual execution environments for a plethora of purposes, such as monitoring, profiling, or performance analysis. For example, a provider implementing the Java® Persistence Application Programming Interface (a.k.a., "JPA") may use dynamic bytecode modification to enhance JPA entities for lazy loading, change tracking, fetching groups, and internal optimizations. Although the JPA specification requires a mechanism be provided to JPA persistence providers to include specific logic into existing Java® entity classes (a.k.a., plain-old-Java®-objects or "POJO"), the specification does not specify the mechanism, nor does the specification explain how to support major modifications of classes or class hierarchies.

In the Java® platform, one mechanism for bytecode modification of a class is to use "class redefinition," which allows modification of a class that has already been loaded into the Java® Virtual Machine (a.k.a.,"JVM®"). However, many JVM®s restrict the types of modifications that may be performed when redefining a class. For example, some JVM®s do not allow redefinitions to add, remove, or rename the fields, methods, or ancestors of an already-loaded class. One mechanism to overcome these limitations is to perform dynamic bytecode modification before the classes to be modified are ever loaded.

Figure 1:
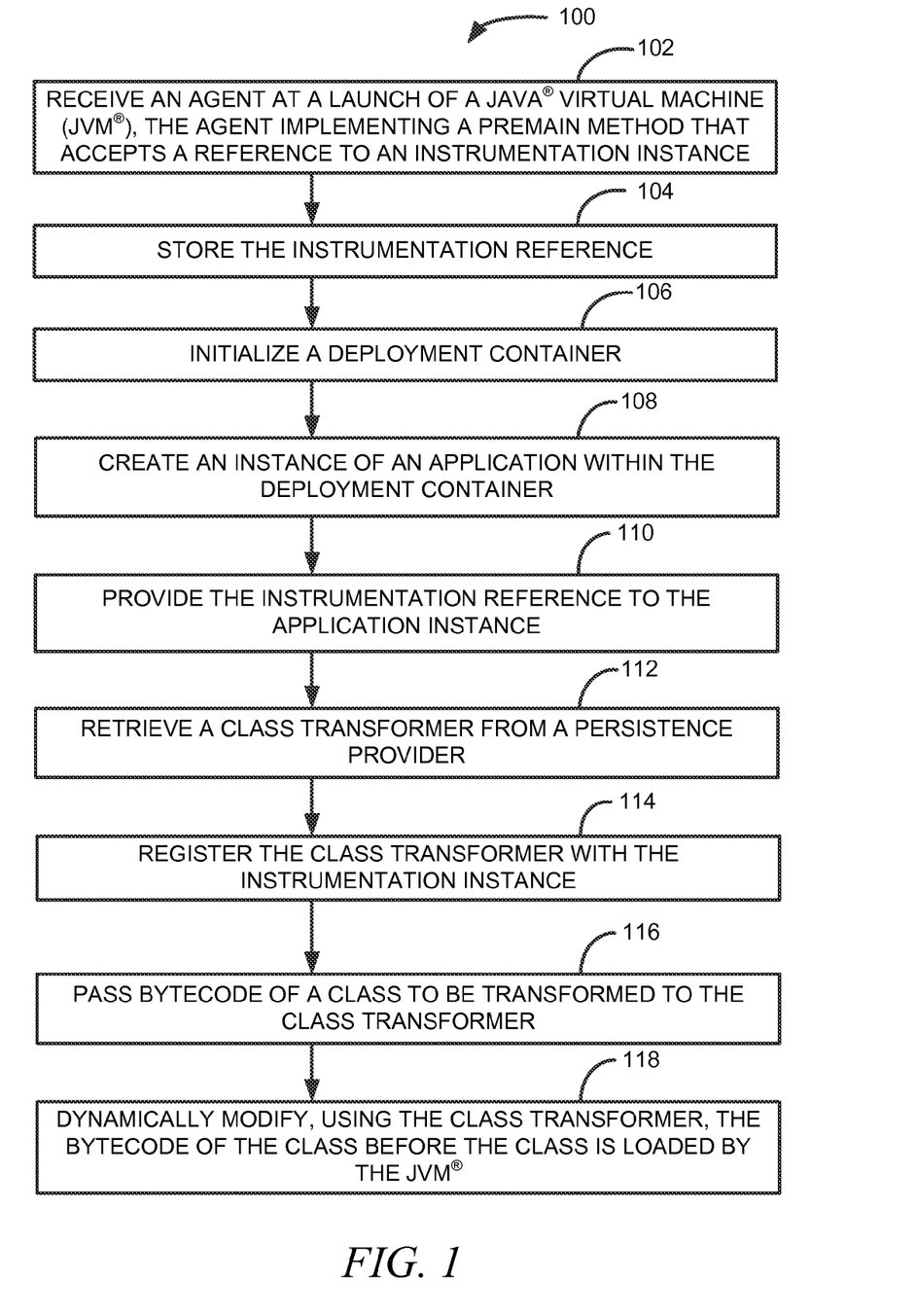
FIG. 1 is a flowchart illustrating a method for dynamic bytecode modification, in accordance with various embodiments.

Turning now to the figures, FIG. 1 is a flowchart illustrating a method 100 for dynamic bytecode modification, in accordance with various embodiments. At 102, a Java® agent is received at a launch of a JVM®. A Java® agent may be specified to the command-line launching of a JVM® by adding the option "-javaagent: jarpath[=options]" to the command-line, where jarpath is the path to the JAR file containing the Java® agent class and options are the agent options. In various embodiments, the manifest of the agent JAR file contains the attribute "Premain-Class". In various embodiments, the value of the Premain-Class attribute is the class name of the Java® agent to be loaded. In various embodiments, the jarpath switch may be used multiple times on the same command-line; in such embodiments, multiple agent instances are created if multiple jarpath switches are used.

In various embodiments, the agent class specified in the Premain-Class attribute implements a method with the signature "public static void premain(java.lang.String agentArgs, java.lang.instrument.Instrumentation inst);". After the JVM® has initialized, the premain method of the agent will be called. In various embodiments, if more than one agent was specified at the command-line, the premain method of each agent will be called in the order the agents were specified on the command-line. In various embodiments, when the premain method of an agent is called by the JVM®, an Instrumentation instance, whose class implements the java.lang.instrument.Instrumentation interface, is passed to the premain method through the "inst" parameter. In various embodiments, the JVM® passes each agent the agent's options specified on the command-line via the agentArgs parameter.

At 104, a reference to the Instrumentation instance is stored. In various embodiments, the Instrumentation reference is stored in a static field of the Java® agent class. In various embodiments, the Instrumentation reference is stored in an instance field of the Java® agent class. In various embodiments, the Instrumentation reference is stored by another object, which makes the Instrumentation reference available to the Java® agent.

At 106, a deployment container is initialized. In various embodiments, the deployment container may be an O.R. ("Object-Relational") Persistence Deployment Container, an Enterprise JavaBeans® ("EJB®") Deployment Container, or a Web Deployment Container. In various embodiments, a JPA container is implemented within the O.R. Persistence Deployment Container. In various embodiments, the O.R. Persistence Deployment Container integrates the JPA container and the deploy service of the application server. Third-party JPA containers may be provided to the application server as a library. In various embodiments, the deployment container implements the javax.persistence.spi.PersistenceUnitInfo interface of the JPA specification. In various embodiments that use a JPA container, configuration files and metadata within JPA entity classes may be used to create the metadata model for the JPA container. In various embodiments, the O.R. Persistence Deployment Container provides integration between third-party JPA containers and the deploy service of the application server.

At 108, an instance of an application to be executed is created within the deployment container. In various embodiments, the application component may be validated and its metadata model created before the application instance is created.

At 110, the reference to the Instrumentation instance is provided to the application instance created at 108. The reference may be provided to the application instance through direct method invocation, through delegation, through a callback method, or by other means.

At 112, a class transformer is retrieved from a persistence provider, such as the JPA Persistence Provider. In various embodiments, the persistence provider implements the PersistenceUnitInfo interface. The persistence provider may call the PersistenceProvider.createContainerEntityManagerFactory method to create an EntityManagerFactory object. This call may be performed before any JPA entity classes (i.e., the classes to be transformed) are loaded.

During the PersistenceProvider.createContainerEntityManagerFactory( ) call all the ClassTransformers are collected in the PersistenceUnitInfo implementation, and each of the collected transformers is wrapped in a JPAClassFileTransformer instance, which implements the java.lang.instrument.ClassFileTransformer interface. In various embodiments, each JPAClassFileTransformer is registered with the Instrumentation using the Instrumentation.addTransformer( ) method. In various embodiments, the registration of each JPAClassFileTransformer occurs in method addTransformers(AuditingExtendedPersistenceUnitInfo persistenceUnitInfo) of the Application class, where AuditingExtendedPersistenceUnitInfo is the container implementation of the interface PersistenceUnitInfo.

At 114, a class transformer is registered with the Instrumentation instance. In various embodiments, the persistence provider may register a class transformer by calling the method PersistenceUnitInfo.addTransformer(javax.persistence.spi.ClassTransformer transformer) and passing the class transformer as the argument to the method. In various embodiments, after registration, the class transformer will be called for every new class definition or class redefinition that gets loaded by the loader returned by the PersistenceUnitInfo.getClassLoader( ).

Each JPAClassTransformer may keep a reference to the ClassLoader returned by PersistenceUnitInfo.getClassLoader( ). Each JPAClassTransformer may also keep a reference to a ClassTransformer (which implements interface javax.persistence.spi.ClassTransformer) provided by the third-party persistence provider.

At 116, a reference to a class that is currently being loaded and is to be transformed is passed to the JPAClassTransformer. In various embodiments, the class reference may be passed by the Instrumentation instance to the JPAClassTransformer by the Instrumentation instance calling the transform( ) method of the JPAClassTransformer. In various embodiments, the JPAClassTransformer will then delegate to the wrapped ClassTransformer the class reference by calling the transform( ) method of the wrapped ClassTransformer.

In the Java® platform, an instance of a ClassLoader is created for each application. The ClassLoader is responsible for loading the classes of its associated application. The application may have references to other applications (i.e., it is possible that the application's ClassLoader could have references to other ClassLoaders). When one class is present in several ClassLoaders, a referenced ClassLoader will have higher priority than the referencing ClassLoader. However, in some cases, the referencing ClassLoader may need to have a higher priority than the referenced ClassLoader. Such a ClassLoader is called a "heavy" ClassLoader.

At 118, the bytecode of the class is dynamically modified by the class transformer before the JVM® finishes loading the class. The transformation occurs only if the class is loaded by the regular ClassLoader of the application where the Persistence Unit has been defined. Any classes loaded from the application heavy ClassLoader will not be transformed.

To solve this problem, in various embodiments, one application may have two ClassLoaders. In various embodiments, the first ClassLoader may be the normal one (i.e., the "heavy" ClassLoader). In various embodiments, the heavy ClassLoader contains only the application components that are located in a specific directory of the application JAR archive. In various embodiments, a check may be performed to determine if a JPA entity class will be loaded by the heavy ClassLoader of the same application; if a JPA entity class is to be loaded by the heavy ClassLoader, that JPA entity class is not transformed.

In various embodiments, the JVM® then loads the modified bytecode of the class and performs the class definition for the modified class. Because the bytecode modification is performed before the JVM® would have loaded the unmodified version of the class, class redefinition is avoided and the JVM®'s restrictions on class redefinitions do not apply.

In various embodiments, all the transformers that are registered in the Instrumentation by the Instrumentation.addTransformer() during the start phase of an application server are unregistered during the stop phase of the application by the Instrumentation.removeTransformer() method.

Figure 2:
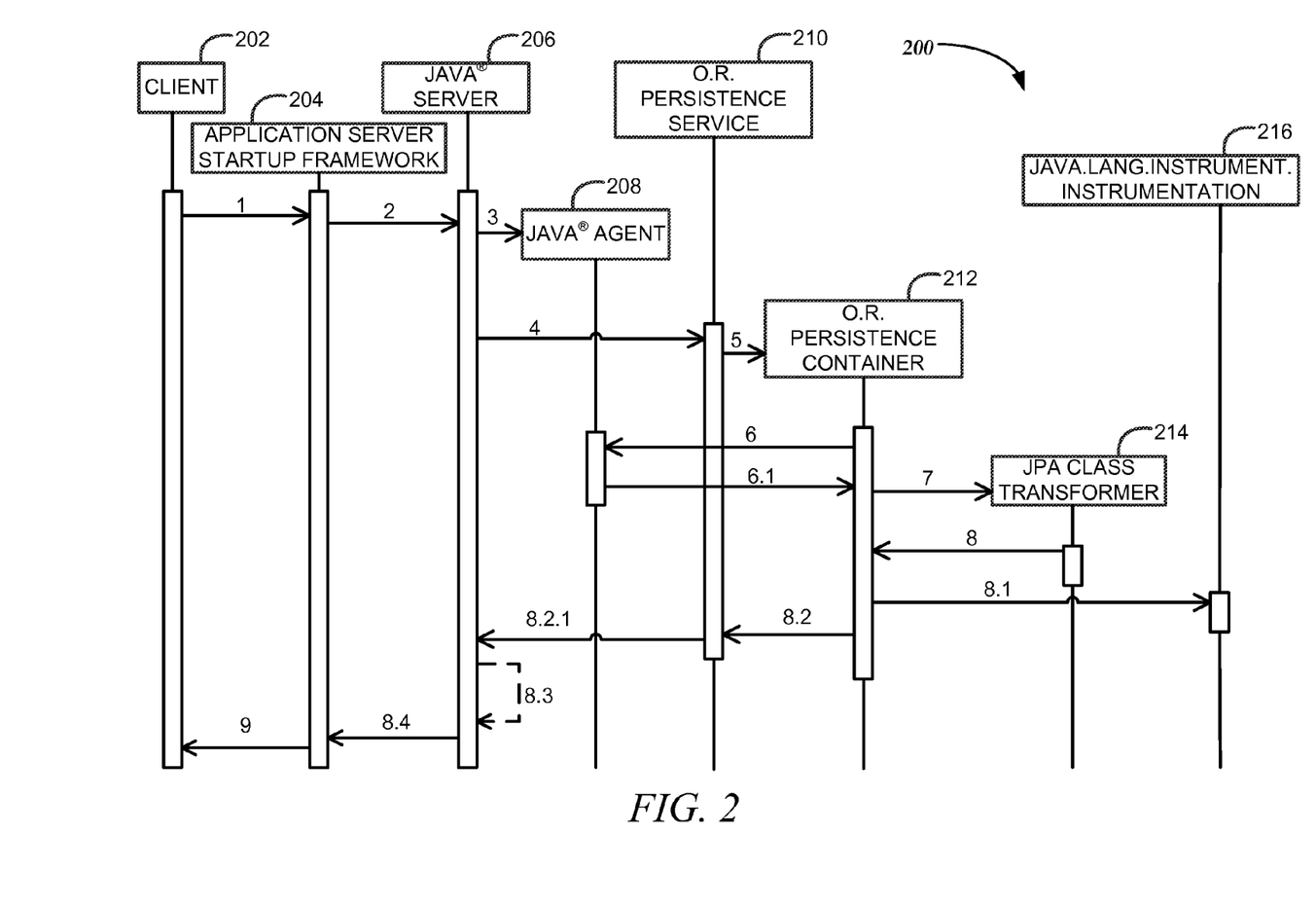
FIG. 2 is a sequence diagram illustrating an initialization of an O.R. Persistence Container, in accordance with various embodiments.

FIG. 2 is a sequence diagram illustrating an initialization of an O.R. Persistence Container 212, in accordance with various embodiments.

At step 1, the client 202 sends a start message to the application server startup framework 204 to begin the process of starting the Java® server 206.

At step 2, the application server startup framework 204 launches the JVM® of the Java® server 206 with a Java® agent 208.

At step 3, the JVM® of the Java® server 206 passes a java.lang.instrument.Instrumentation instance 216 to the premain method of the Java® agent 208.

At step 4, the Java® server 206 invokes the start method of the O.R. Persistence Service 210. In various embodiments, the Java® server 206 passes a reference to the java.lang.instrument.Instrumentation instance 216 to the O.R. Persistence Service 210, and the O.R. Persistence Service 210 stores the reference.

At step 5, the O.R. Persistence Service 210 causes a new O.R. Persistence Container 212 to be created and causes the O.R. Persistence Container 212 to be registered in the deploy service.

At step 6, the O.R. Persistence Container 212 requests a reference to the java.lang.instrument.Instrumentation instance 216 from the Java® agent 208. At step 6.1, the java.lang.instrument.Instrumentation instance 216 is received and stored by the O.R. Persistence Container 212.

According to the JPA 1.0 specification, the PersistenceUnitInfo interface is implemented by the container and is used by the persistence provider during creation of the EntityManagerFactory (i.e., in the PersistenceProvider.createContainerEntityManagerFactory() call). Using the PersistenceUnitInfo.addTransformer (javax.persistence.spi.ClassTransformer transformer) method, the persistence provider adds a transformer that will be called for every new class definition that gets loaded by the loader returned by the PersistenceUnitInfo.getClassLoader() as well as classes loaded by the application heavy ClassLoader. During the PersistenceProvider.createContainerEntityManagerFactory() call, all the ClassTransformers are collected in the PersistenceUnitInfo implementation.

At step 7, after the PersistenceProvider.createContainerEntityManagerFactory() call, each of the collected transformers is wrapped in a new JPA Class Transformer 214, which implements the java.lang.instrument.ClassFileTransformer interface.

At step 8, the O.R. Persistence Container 212 receives a reference to each JPA Class Transformer 214. At step 8.1, each JPA Class Transformer 214 is registered in the java.lang.instrument.Instrumentation instance 216 by the Instrumentation.addTransformer() method.

At step 8.2, the O.R. Persistence Container 212 returns from the call made by the O.R. Persistence Service 210 at step 5.

At step 8.2.1, control is returned from the start method of the O.R. Persistence Service 210, which was invoked by the Java® server 206 at step 4.

At step 8.3, the Java® server 206 may optionally perform additional initializations before returning control to the application server startup framework 204.

At step 8.4, the Java® server 206 returns control to the application server startup framework 204.

At step 9, the application server startup framework 204 returns control to the calling client 202.

Figure 3:
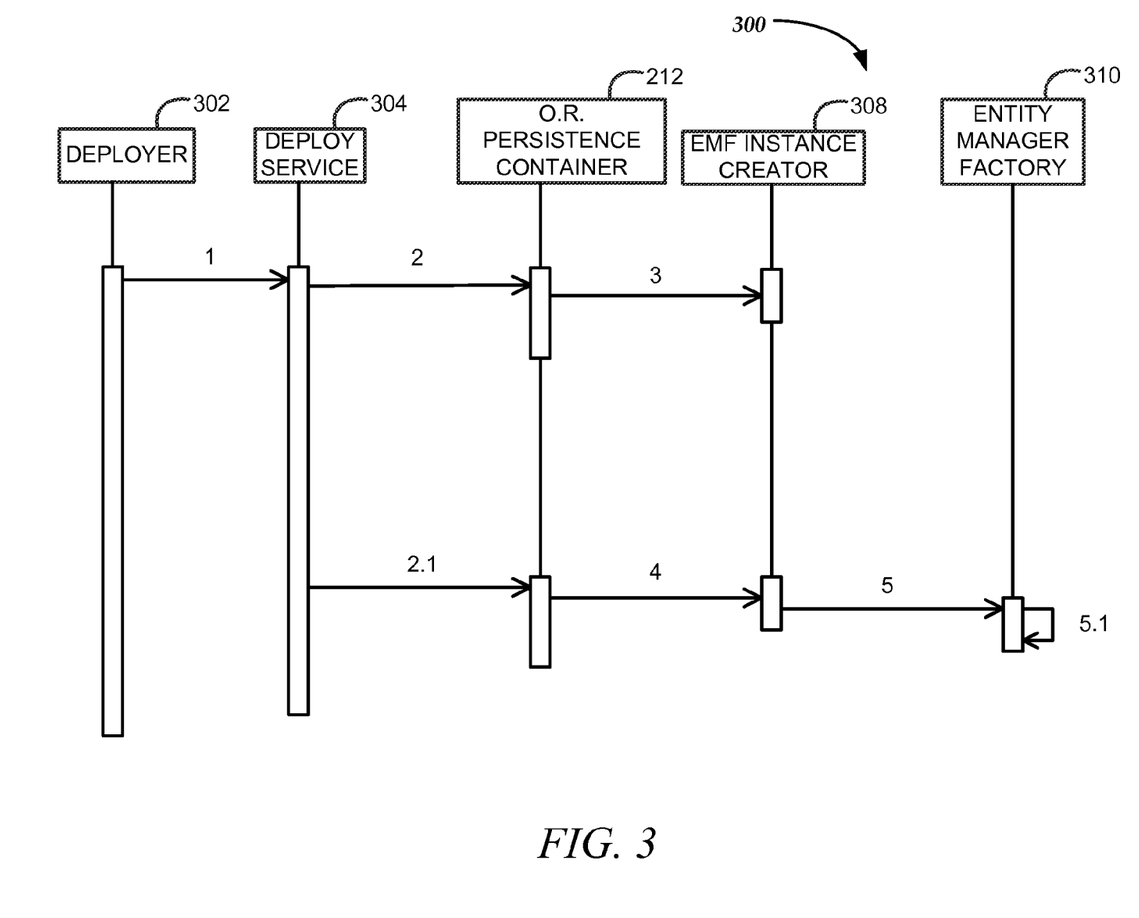
FIG. 3 is a sequence diagram illustrating a deployment of a persistent application into an O.R. Persistence Container when dynamic byte code modification is not enabled, in accordance with various embodiments.

FIG. 3 is a sequence diagram illustrating a deployment of a persistent application into an O.R. Persistence Container when dynamic byte code modification is not enabled, in accordance with various embodiments. In various embodiments, when dynamic byte code modification is not enabled or when the JPA provider is the default provider, the Entity Manager Factory 310 is not instantiated during deployment of the application. In these cases, the Entity Manager Factory 310 will be lazily created (i.e., on-demand) during a servlet or EJB® request.

At step 1, deployer 302 deploys an application containing a JPA Persistence Unit.

At step 2, the deploy service 304 calls the deploy method on the O.R. Persistence Container 212. At step 2.1, the deploy service 304 calls the start method on the O.R. Persistence Container 212.

At step 3, the O.R. Persistence Container 212 calls the create method of the EMF Instance Creator 308. If instrumentation is disabled, which would occur if either dynamic byte code modification was not enabled or if the JPA provider is the default provider, the EMF Instance Creator 308 does not create an Entity Manager Factory 310 until a servlet or EJB® request occurs (as further explained in FIG. 4). Thus, step 4 (requesting the Entity Manager Factory 310 from the EMF Instance Creator 308), step 5 (the EMF Instance Creator 308 creating a new instance of an Entity Manager Factory 310), and step 5.1 (the Entity Manager Factory 310 loading and transforming classes using dynamic byte code modification) will be skipped.

Figure 4:
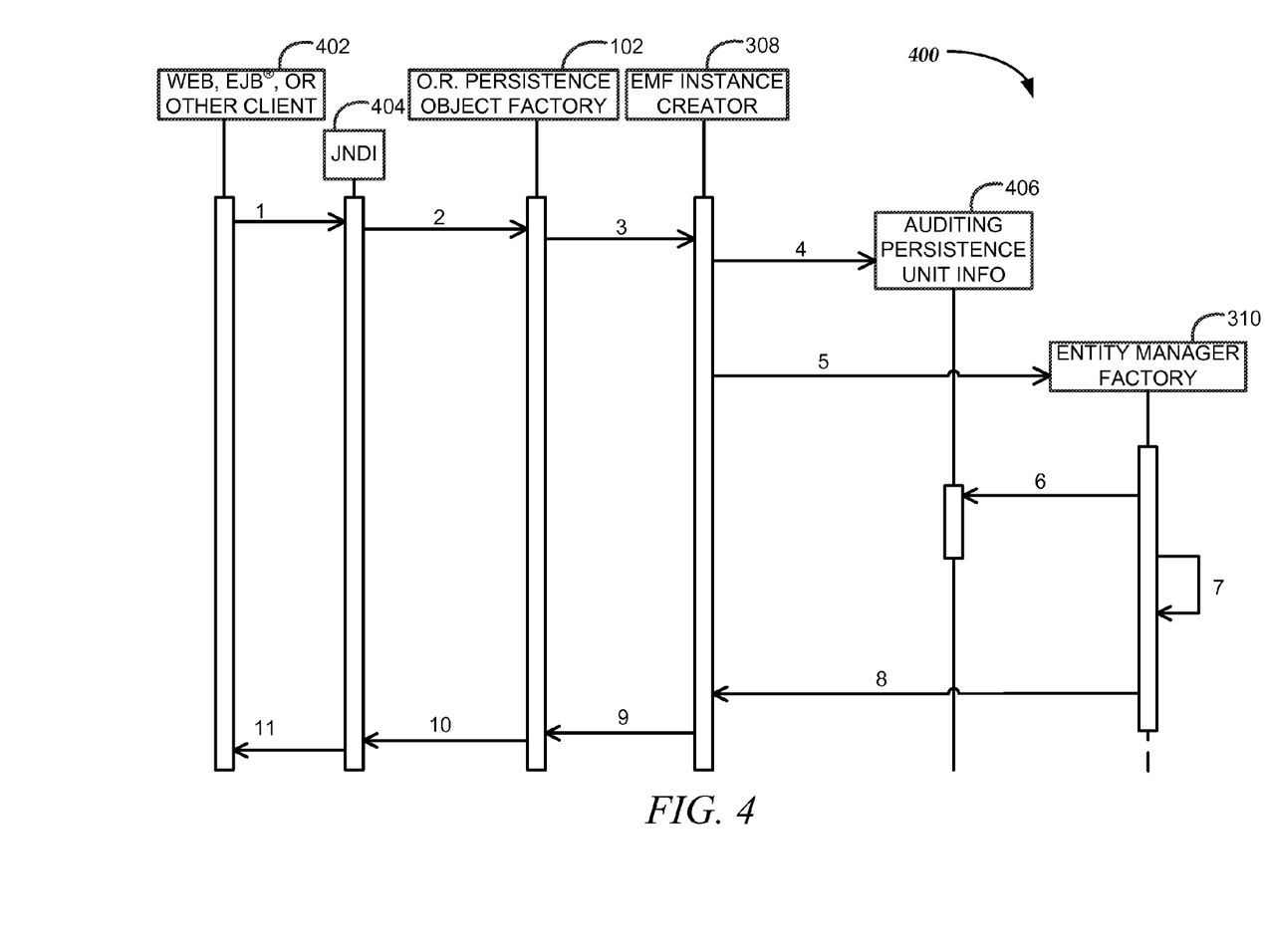
FIG. 4 is a sequence diagram illustrating an on-demand creation of an EntityManagerFactory, in accordance with various embodiments.

FIG. 4 is a sequence diagram illustrating an on-demand creation of an Entity Manager Factory 310, in accordance with various embodiments. On-demand creation of an Entity Manager Factory 310 occurs if either dynamic byte code modification is not enabled or the JPA provider is the default provider. In such cases, the Entity Manager Factory 310 is not instantiated during application deployment, but rather is created using "lazy-initialization" (i.e., on-demand) during a servlet or EJB® request.

At step 1, a web, EJB®, or other client 402 causes the lookupEMF() method to be called.

At step 2, the Java® Naming and Directory Interface (JNDI) process 404 causes the getObjectInstance() method of the O.R. Persistence Object Factory 102 to be called.

At step 3, the O.R. Persistence Object Factory 102 causes the getEntityManagerFactory( ) method of the EMF Instance Creator 308 to be called.

At step 4, a new instance of the Auditing Persistence Unit Info 406 class is created.

At step 5, the createContainerEntityManagerFactory(auditingInfo, intProps) method is called on the Persistence Provider.

At step 6, the Persistence Provider adds class transformers during the creation of the Entity Manager Factory 310 (which occurs at step 5) by causing the PersistenceUnitInfo.addTransformer(javax.persistence.spi.ClassTransformer transformer) method to be called. All of the added class transformers are collected in the Auditing Persistence Unit Info 406 and are registered in the Instrumentation instance 216 by the Instrumentation.addTransformer( ) method.

At step 7, the Entity Manager Factory 310 loads the managed entity classes. The O.R. Persistence Container 212 intercepts the class loading and uses the EMF transformers to transform the byte code. For additional details, see FIG. 7.

At step 8, the createContainerEntityManagerFactory(auditingInfo, intProps) method returns control to the EMF Instance Creator 308.

At step 9, the EMF Instance Creator 308 returns control to the O.R. Persistence Object Factory 102.

At step 10, the O.R. Persistence Object Factory 102 returns control to the JNDI process 404.

At step 11, the JNDI process 404 returns control to the web, EJB®, or other client 402.

Figure 5:
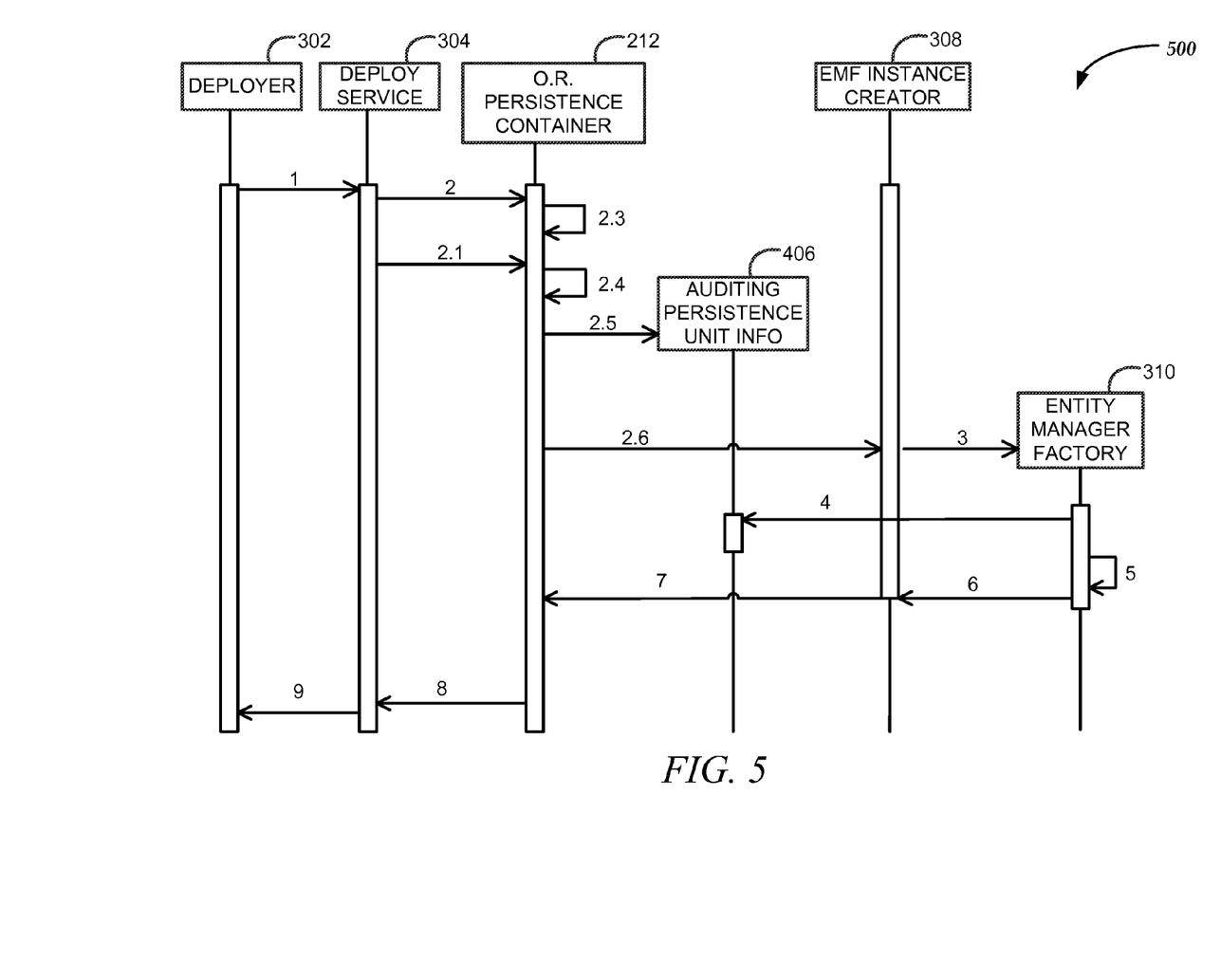
FIG. 5 is a sequence diagram illustrating instantiation of an Entity Manager Factory during deployment, in accordance with various embodiments.

FIG. 5 is a sequence diagram illustrating instantiation of an Entity Manager Factory 310 during deployment, in accordance with various embodiments. The Entity Manager Factory 310 is instantiated when dynamic byte code modification is enabled and the JPA provider is not the default provider.

At step 1, the deployer 302 deploys an application containing a JPA Persistence Unit.

At steps 2 and 2.1, the deploy service 304 calls the deploy method and start method on the O.R. Persistence Container 212.

At step 2.3, the O.R. Persistence Container 212 may create a metadata model.

At step 2.4, the O.R. Persistence Container 212 may perform additional initializations.

At step 2.5, the O.R. Persistence Container 212 causes a new instance of the Auditing Persistence Unit Info 406 class to be created.

At step 2.6, the O.R. Persistence Container 212 requests the Entity Manager Factory 310 from the EMF Instance Creator 308.

At step 3, the EMF Instance Creator 308 creates an Entity Manager Factory 310 by calling the createContainerEntityManagerFactory(auditingInfo, intProps) method on the Persistence Provider.

At step 4, the Persistence Provider adds class transformers during the creation of the Entity Manager Factory 310 (which occurs at step 3) by causing the PersistenceUnitInfo.addTransformer(javax.persistence.spi.ClassTransformer transformer) method to be called. All of the added class transformers are collected in the Auditing Persistence Unit Info 406. Each of the collected transformers in the Auditing Persistence Unit Info 406 is wrapped in a JPAClassFileTransformer (which implements the java.lang.instrument.ClassFileTransformer interface) and is registered in the Instrumentation instance 216 by the Instrumentation.addTransformer( ) method.

At step 5, the Entity Manager Factory 310 loads the managed entity classes. The O.R. Persistence Container 212 intercepts the class loading and uses the EMF transformers to transform the byte code. For additional details, see FIG. 7.

At step 6, the createContainerEntityManagerFactory(auditingInfo, intProps) method returns control to the EMF Instance Creator 308.

At step 7, the EMF Instance Creator 308 returns control to the O.R. Persistence Container 212.

At step 8, the O.R. Persistence Container 212 returns control to the deploy service 304.

At step 9, the deploy service 304 returns control to the deployer 302.

Figure 6:
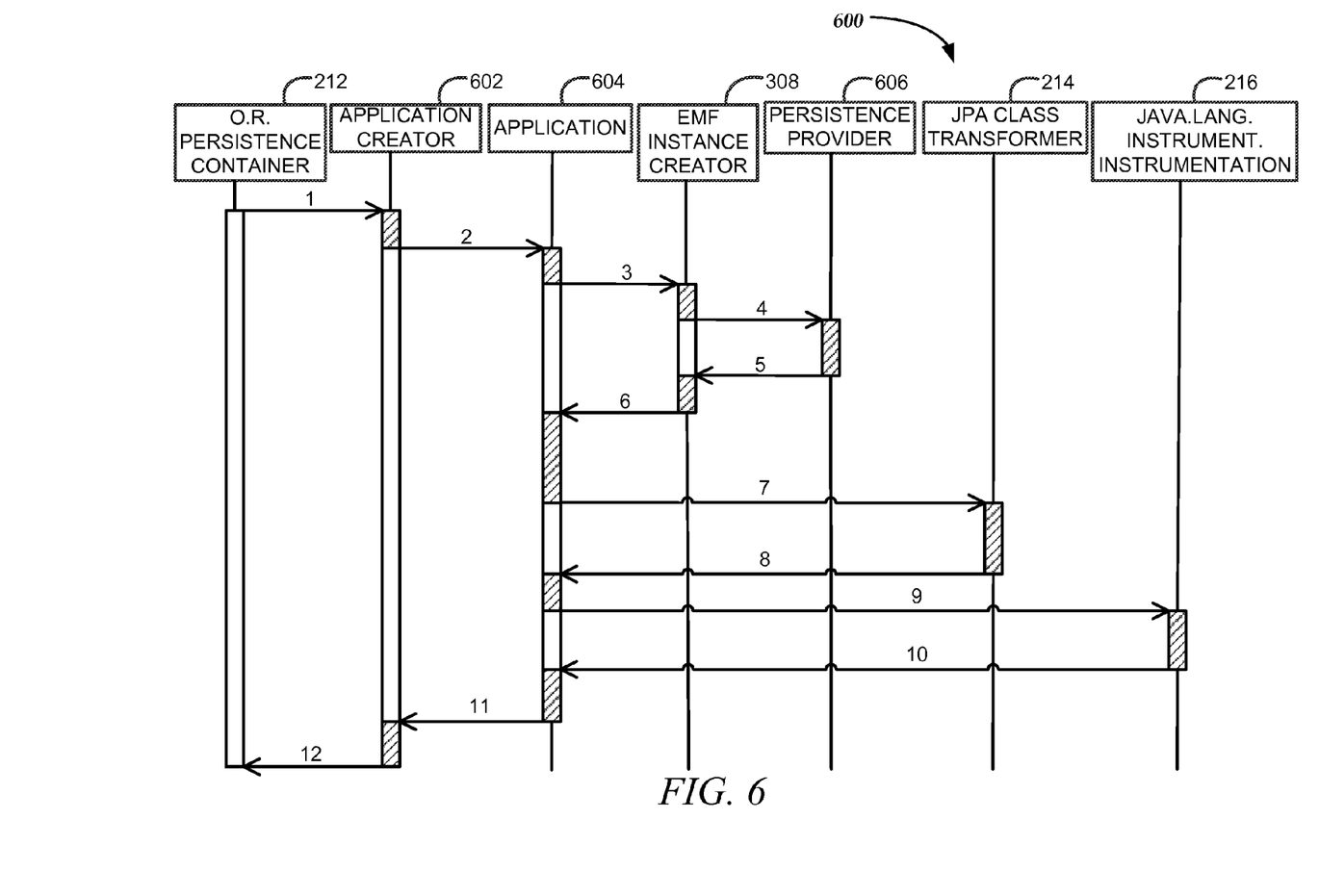
FIG. 6 is another sequence diagram illustrating an instantiation of an Entity Manager Factory during deployment, in accordance with various embodiments.

FIG. 6 is another sequence diagram illustrating an instantiation of an Entity Manager Factory 310 during deployment, in accordance with various embodiments.

At step 1, the O.R. Persistence Container 212 calls the execute method and passes control to the Application Creator 602.

At step 2, the Application Creator 602 calls the createEMFs( ) method and passes control to the Application 604.

At step 3, the Application 604 calls the getEMF(persistenceProvider) method and passes control to the EMF Instance Creator 308.

At step 4, the EMF Instance Creator 308 calls the createContainerEntityManagerFactory(persistenceUnitInfo) method and passes control to the Persistence Provider 606.

At step 5, the Persistence Provider 606 returns control to the EMF Instance Creator 308.

At step 6, the EMF Instance Creator 308 returns control to the Application 604.

At step 7, the Application 604 calls the JPAClassTransformer(puInfo.getTransformers( ).iterate) method and passes control to the JPA Class Transformer 214.

At step 8, the JPA Class Transformer 214 returns control to the Application 604.

At step 9, the Application 604 calls the addTransformer(jpaTransformer) method and passes control to the java.lang.instrument.Instrumentation 216.

At step 10, the java.lang.instrument.Instrumentation 216 returns control to the Application 604.

At step 11, the Application 604 returns control to the Application Creator 602.

At step 12, the Application Creator 602 returns control to the O.R. Persistence Container 212.

Figure 7:
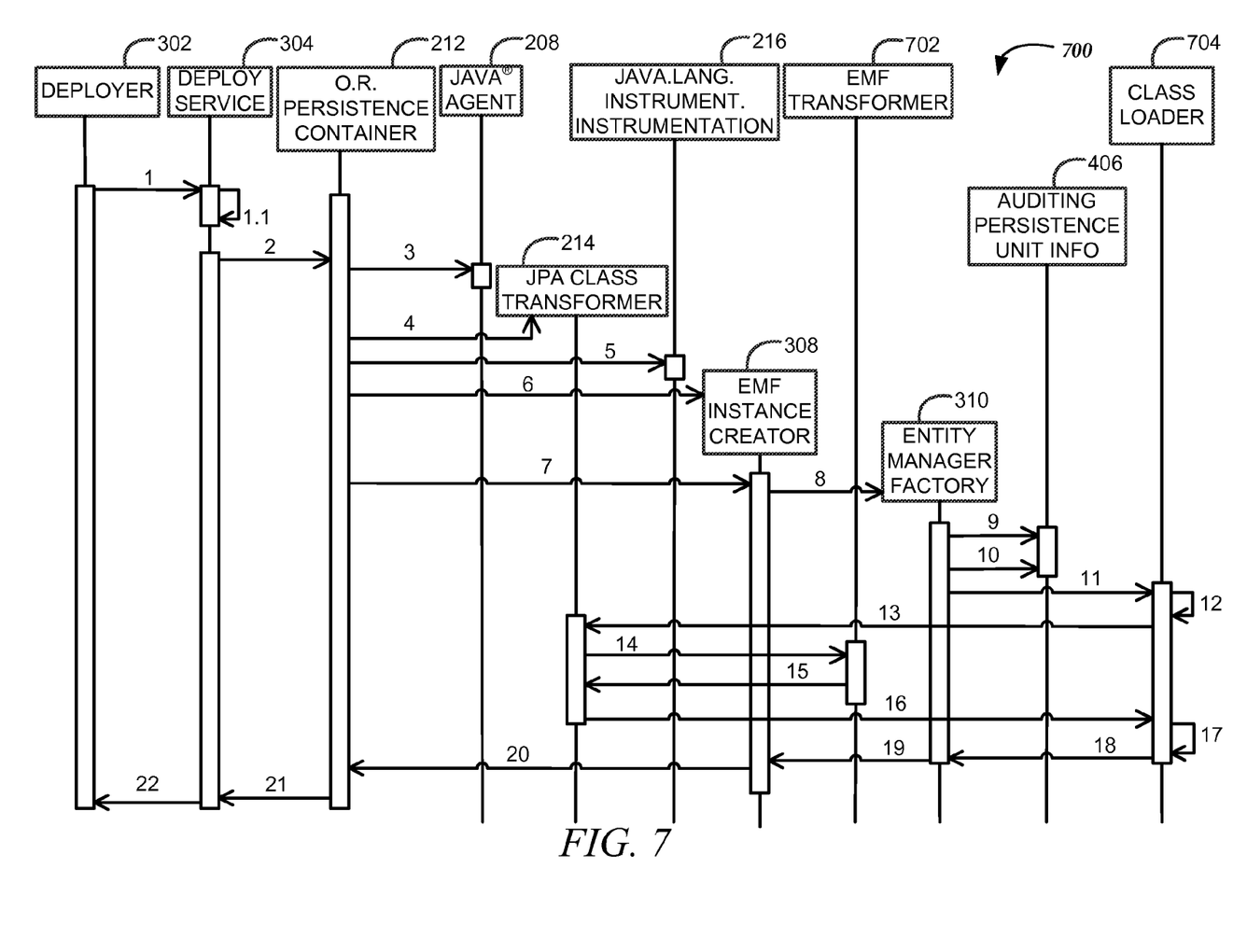
FIG. 7 is a sequence diagram illustrating a dynamic bytecode transformation of a managed entity class, in accordance with various embodiments.

FIG. 7 is a sequence diagram illustrating a dynamic bytecode transformation of a managed entity class, in accordance with various embodiments.

At step 1, the deployer 302 starts to deploy an application 604 with a Persistence Unit.

At step 1.1, the deploy service 304 loads the temporary class loader. When using a temporary class loader, no classes will be defined and resolved with the real class loader of the application. This temporary class loader is used to inspect and validate the application classes and metadata.

At step 2, the deploy service 304 starts the O.R. Persistence Container 212 by passing the Persistence Unit to the O.R. Persistence Container 212. No application classes will be loaded at this point because the O.R. Persistence Container 212 has a higher priority than the containers using the Persistence Unit and because the O.R. Persistence Container 212 reads bytecode directly.

At step 3, the O.R. Persistence Container 212 calls the getInstrumentation( ) method on the Java® agent 208.

At step 4, the O.R. Persistence Container 212 calls the newInstance( ) method to create a new JPA Class Transformer 214.

At step 5, the O.R. Persistence Container 212 calls the addTransformer(JPAClassTransformer) method on the java- .lang.instrument.Instrumentation 216 instance, passing a reference to the JPA Class Transformer 214.

At step 6, the O.R. Persistence Container 212 calls the newInstance( ) method to create a new EMF Instance Creator 308.

At step 7, the O.R. Persistence Container 212 requests a reference to an EntityManagerFactory 310 from the EMF Instance Creator 308 by calling the getEMF( ) method.

At step 8, the EMF Instance Creator 308 calls the newInstance( ) method to create a new EntityManagerFactory 310.

At step 9, the EntityManagerFactory 310 adds class transformers by calling the method addTransformer(EMFTransformer) on the Auditing Persistence Unit Info 406.

At step 10, the EntityManagerFactory 310 requests a Class Loader 704 from the Auditing Persistence Unit Info 406 by calling the getClassLoader( ) method of the Auditing Persistence Unit Info 406.

At step 11, after receiving a reference to Class Loader 704, the EntityManagerFactory 310 loads the managed entity classes.

At step 12, the Class Loader 704 reads the bytecode of the managed entity classes.

At step 13, the all of the JPA Class Transformers 214 are already registered at step 9 in the java.lang.instrument.Instrumentation 216. Each JPAClassTransformer 214 holds references to the persistence unit's regular Class Loader, heavy ClassLoader, and the wrapped javax.persistence.spi.ClassTransformer. The Class Loader 704 then calls the transform(byte[ ]) method of each JPAClassTransformer 214.

At step 14, the bytecode of the managed entity class is transformed (via delegation to the original ClassTransformer.transform method) only if the managed entity class is loaded by the application's regular ClassLoader or heavy ClassLoader.

At step 15, the transformed bytecode of the managed entity class is passed back to the JPA Class Transformer 214.

At step 16, the JPA Class Transformer 214 passes the transformed bytecode of the managed entity class to the Class Loader 704.

At step 17, the Class Loader 704 defines and resolves the transformed managed entity class.

At step 18, the Class Loader 704 passes the transformed and loaded managed entity class to the EntityManagerFactory 310.

At step 19, the EntityManagerFactory 310 returns from the newInstance( ) method called at step 8.

At step 20, the EMF Instance Creator 308 returns from the getEMF( ) method called at step 7.

At step 21, the O.R. Persistence Container 212 returns from the starting of the O.R. Persistence Container 212 at step 2.

At step 22, the deploy service 304 returns from the starting of the application deployment at step 1.

Figure 8:
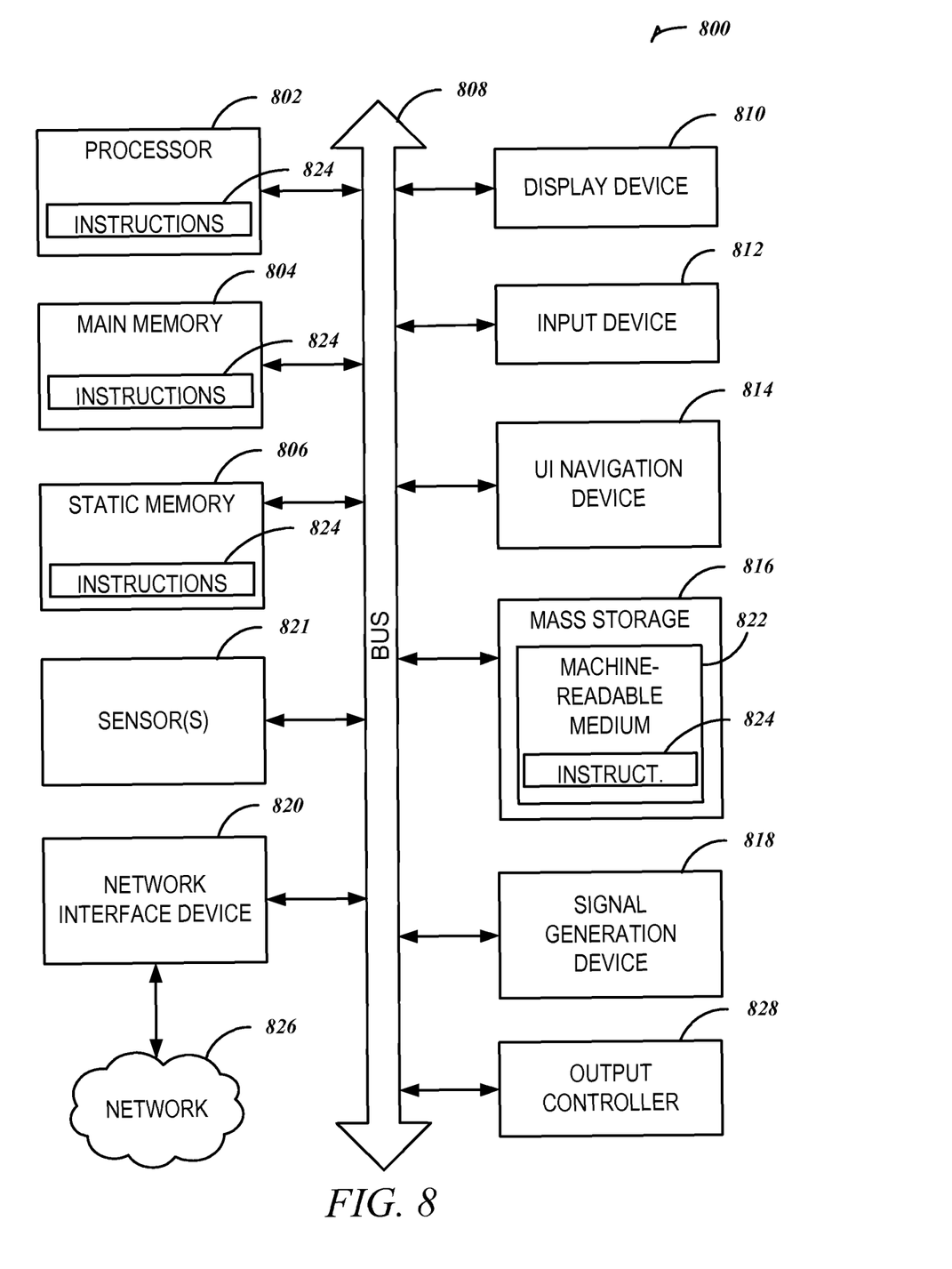
FIG. 8 illustrates a functional block diagram of an example machine, in accordance with various embodiments, upon which any one or more of the techniques (e.g., methodologies) discussed herein can perform.

FIG. 8 illustrates a functional block diagram of an example machine 800, in accordance with various embodiments, upon which any one or more of the techniques (e.g., methodologies) discussed herein can perform. In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (S7S), other computer cluster configurations.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Machine (e.g., computer system) 800 can include a hardware processor 802 (e.g., a central processing unit (CPU), a graphics processing unit (GPU), a hardware processor core, or any combination thereof), a main memory 804 and a static memory 806, some or all of which can communicate with each other via a bus 808. The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR)) connection to communicate or control one or more peripheral devices (e.g., a printer, card reader, etc.).

The storage device 816 can include a machine-readable medium 822 on which is stored one or more sets of data structures or instructions 824 (e.g., software) embodying or utilized by any one or more of the techniques or functions described herein. The instructions 824 can also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 can constitute machine-readable media.

While the machine-readable medium 822 is illustrated as a single medium, the term "machine-readable medium" can include a single medium or multiple media (e.g., a centralized or distributed database, and/or associated caches and servers) that configured to store the one or more instructions 824.

The term "machine-readable medium" can include any tangible medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 can further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Although example machine 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 800 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 800 may include one or more processors and may be configured with instructions stored on a computer-readable storage device.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving an agent at a launch of a Java® Virtual Machine (JVM®), the agent including a field for storing a reference to an instrumentation instance and implementing a premain method, the premain method accepting the reference to the instrumentation instance;
storing the instrumentation reference;
initializing a deployment container;
creating an instance of an application within the deployment container;
providing the instrumentation reference to the application instance;
retrieving a class transformer from a persistence provider;
registering the class transformer with the instrumentation instance;
passing bytecode of a class to be transformed to the class transformer;
dynamically modifying, using the class transformer, the bytecode of the class before the class is loaded by the JVM® when the class is to be loaded by a class loader other than a regular class loader of the application, wherein the modified class, after being loaded by the JVM®, is arranged to execute according to its modified bytecode.

2. The method of claim 1, wherein the deployment container is one of an O.R. (Object-Relational) Persistence Deployment Container, an EJB® (Enterprise JavaBeans®) Deployment Container, and a Web Deployment Container.

3. The method of claim 1, wherein the persistence provider is a Java® Persistence Application Programming Interface (JPA) Persistence Provider.

4. The method of claim 3, further comprising:
instantiating an entity manager factory during deployment of the application only when dynamic bytecode modification is enabled and when the JPA Persistence Provider is a not the default provider.

5. The method of claim 1, further comprising:
checking, prior to the dynamic modification, whether the class to be modified is to be loaded by a heavy class loader of the application.

6. The method of claim 1, further comprising:
instantiating, using lazy initialization, an entity manager factory upon receiving a client request when the JPA provider is the default provider.

7. A non-transitory computer-readable storage medium, with
instructions stored thereon, which when executed by at least one processor of a computing device, cause the computing device to perform operations comprising:
receiving an agent at a launch of a Java® Virtual Machine (JVM®), the agent including a field for storing a reference to an instrument instance and implementing a premain method, the premain method accepting a reference to an instrumentation instance;
storing the instrumentation reference;
initializing a deployment container;
creating an instance of an application within the deployment container;
providing the instrumentation reference to the application instance;
retrieving a class transformer from a persistence provider;
registering the class transformer with the instrumentation instance;
passing bytecode of a class to be transformed to the class transformer;
dynamically modifying, using the class transformer, the bytecode of the class before the class is loaded by the JVM® when the class is to be loaded by a class loader other than a regular class loader of the application, wherein the modified class, after being loaded by the JVM®, is arranged to execute according to its modified bytecode.

8. The non-transitory computer-readable storage medium of claim 7, wherein the deployment container is one of an O.R. (Object-Relational) Persistence Deployment Container, an EJB® (Enterprise JavaBeans®) Deployment Container, and a Web Deployment Container.

9. The non-transitory computer-readable storage medium of claim 7, wherein the persistence provider is a Java® Persistence Application Programming Interface (JPA) Persistence Provider.

10. The non-transitory computer-readable storage medium of claim 7, with further instructions stored thereon which, when executed by the processor, cause the computing device to:
check, prior to the dynamic modification, whether the class to be modified is to be loaded by a heavy class loader of the application.

11. The non-transitory computer-readable storage medium of claim 7, with further instructions stored thereon which, when executed by the processor, cause the computing device to:
instantiate an entity manager factory during deployment of the application only when dynamic bytecode modification is enabled and when the JPA Persistence Provider is a not the default provider.

12. The non-transitory computer-readable storage medium of claim 7, with further instructions stored thereon which, when executed by the processor, cause the computing device to:
instantiate, using lazy initialization, an entity manager factory upon receiving a client request when the JPA provider is the default provider.

13. A system, comprising:
a processor and a memory device operatively coupled via a bus; and instructions stored in the memory device and executable by the processor to:
receive an agent at a launch of a Java® Virtual Machine (JVM®), the agent including a field for storing a reference to an instrument instance and implementing a premain method, the premain method accepting a reference to an instrumentation instance;
store the instrumentation reference;
initialize a deployment container;
create an instance of an application within the deployment container;
provide the instrumentation reference to the application instance;
retrieve a class transformer from a persistence provider;
register the class transformer with the instrumentation instance;
pass bytecode of a class to be transformed to the class transformer;
dynamically modify, using the class transformer, the bytecode of the class before the class is loaded by the JVM® when the class is to be loaded by a class loader other than a regular class loader of the application, wherein the modified class, after being loaded by the JVM®, is arranged to execute according to its modified bytecode.

14. The system of claim 13, wherein the deployment container is one of an O.R. (Object-Relational) Persistence Deployment Container, an EJB® (Enterprise JavaBeans®) Deployment Container, and a Web Deployment Container.

15. The system of claim 13, wherein the persistence provider is a Java® Persistence Application Programming Interface (JPA) Persistence Provider.

16. The system of claim 13, instructions stored in the memory device and executable by the processor to:
check, prior to the dynamic modification, whether the class to be modified is to be loaded by a heavy class loader of the application.

17. The system of claim 13, instructions stored in the memory device and executable by the processor to:
instantiate an entity manager factory during deployment of the application only when dynamic bytecode modification is enabled and when the JPA Persistence Provider is a not the default provider.

18. The system of claim 13, instructions stored in the memory device and executable by the processor to:
instantiate, using lazy initialization, an entity manager factory upon receiving a client request when the JPA provider is the default provider.

* * * * *